United States Patent [19]
Morariu et al.

[11] Patent Number: 6,108,389
[45] Date of Patent: Aug. 22, 2000

[54] SYNCHRONIZATION OF INTERNAL CODER-DECODERS OF MULTIPLE MICROPROCESSORS

[75] Inventors: Bogdan M. Morariu, West Vancouver; William S. Burchill, Vancouver, both of Canada

[73] Assignee: Motorola, Inc., Schaumburg, Ill.

[21] Appl. No.: 08/988,862

[22] Filed: Dec. 11, 1997

[51] Int. Cl.[7] ............................................. H04B 1/38
[52] U.S. Cl. ..................... 375/355; 375/357; 713/400; 710/260
[58] Field of Search ............................ 375/219, 222, 375/354, 355, 357, 377, 347, 349; 710/260; 713/400; 370/502

[56] References Cited

U.S. PATENT DOCUMENTS

| | | | |
|---|---|---|---|
| 4,849,703 | 7/1989 | Easley et al. . | |
| 5,481,574 | 1/1996 | Evert et al. . | |
| 5,648,964 | 7/1997 | Inagaki et al. | 370/228 |
| 5,852,728 | 12/1998 | Matsuda et al. | 395/556 |
| 5,964,880 | 10/1999 | Liu et al. | 713/401 |

*Primary Examiner*—Amanda T. Le
*Attorney, Agent, or Firm*—J. Ray Wood; Charles W. Bethards

[57] ABSTRACT

A method and apparatus of bringing sampling instants of a first internal coder-decoder (14) of a first microprocessor (10) into synchronization with sampling instants of a second internal coder-decoder (20) of a second microprocessor (12). The first and second microprocessors (10 and 12) wait a predetermined time to achieve phase lock. A common interrupt is generated by the first microprocessor (10). The common interrupt is simultaneously sent to and received by the first and second microprocessors (10 and 12). The first and second internal coder-decoders (14 and 20) are forced into a known state simultaneously.

8 Claims, 2 Drawing Sheets

SYNCHRONIZATION OF INTERNAL CODER-DECODERS OF MULTIPLE MICROPROCESSORS

FIELD OF THE INVENTION

The present invention relates generally to synchronization of internal coder-decoders of multiple microprocessors.

BACKGROUND OF THE INVENTION

Recent developments have combined a coder-decoder (CODEC) and digital signal processor (DSP) on a common chip. Currently, microprocessor architectures implement either a single CODEC or none at all. Due to developments in multi-channel signal processing architectures, at least two microprocessors are needed, each independently having a CODEC and a phase-locked loop (PLL). However, when multiple microprocessors are used, their respective CODECs are generally not synchronized.

Because the acquisition times of internal PLL clock generators vary between microprocessors, the exact synchronization times cannot be controlled. All events between the two microprocessors are not co-incident due to this lack of synchronization, thus causing the CODECs to obtain their samples at slightly different times. However, there are many applications which utilize multiple microprocessors where the data or signal samples need to be obtained at precisely the same instants of time.

One such application is in wireless data communications in the field of diversity reception where two or more independent receivers are employed. Each receiver contains various components including a microprocessor (e.g., a DSP) and a CODEC within each microprocessor. For coherent signal combination the signals from each microprocessor must be obtained at precisely the same instants of time, or substantial processing delays must be introduced to compensate.

A solution for obtaining synchronized sampling with multiple CODECs is to drive them with a common clock. A high frequency clock is fed into both microprocessors and, in turn, the PLLs are bypassed. Unfortunately, even when the microprocessors are driven by a common clock, the CODECs may still not be synchronized. This is due to the fact that a portion of the feedback path of the PLL is implemented utilizing analog components, and due to the variability of these analog components, the lock time of such PLLs cannot be as precisely obtained as is required for coherent signal combination.

It is well known in electrical design that it takes a variable amount of time for the PLL to stabilize, due to the variability of the analog components, before accurate sampling of a signal can be established. This variable amount of time is a function of the characteristics of the materials from which the components are manufactured, as well as the conditions, such as minimum and maximum operating temperature, under which the components may operate. Component manufacturers publish these characteristics as part of the specifications for the components which they sell.

A high frequency clock cannot be fed into both microprocessors and, in turn, bypass the internal PLLs because of the side effects of electromagnetic interference. The electromagnetic interference is due to the high frequency coupling which adversely impacts the adjacent analog circuitry.

A hardware solution to the same problem involves extensive shielding and significant layout changes. However, the hardware solution is discounted due to significant increase in cost.

Thus, a need exists to bring sampling instants of a first CODEC of a first microprocessor into synchronization with sampling instants of a second CODEC of a second microprocessor to allow for coherent signal combination without major modifications to the hardware.

BRIEF DESCRIPTION OF THE DRAWINGS

A preferred embodiment of the invention is now described, by way of example only, with reference to the accompanying drawings in which.

DETAILED DESCRIPTION OF THE PREFERRED EMBODIMENT

Figure 1:
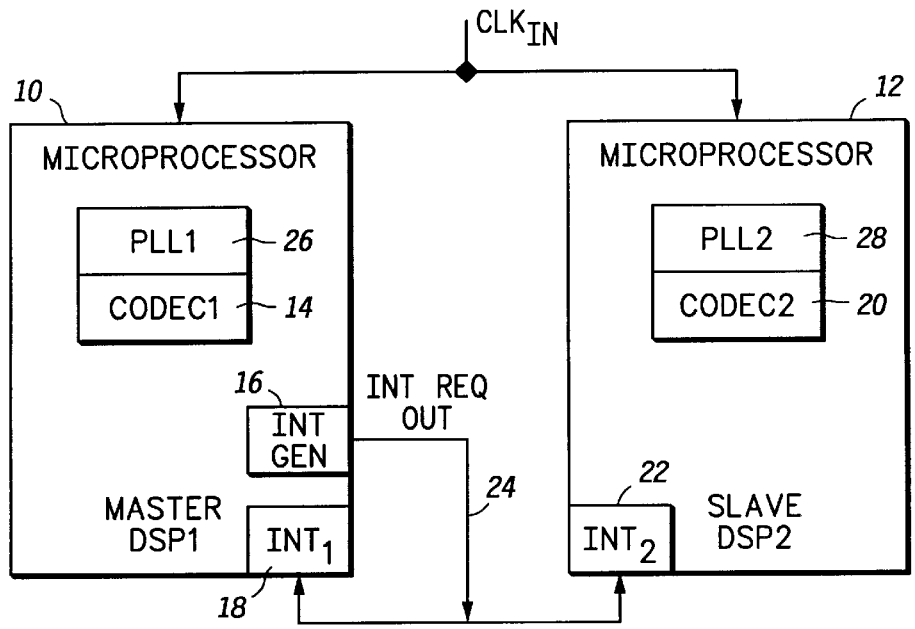
FIG. 1 is a block diagram of first and second microprocessors according to the preferred embodiment of the present invention.

A first microprocessor 10 and a second microprocessor 12 are shown in FIG. 1. The first microprocessor 10 comprises a first internal coder-decoder 14 (CODEC), an interrupt generator 16 and a first interrupt service routine 18. The second microprocessor 12 comprises a second internal CODEC 20 and a second interrupt service routine 22. A common low frequency clock (CLKIN) is coupled to drive the first and second microprocessors 10 and 12. The interrupt generator 16 of the first microprocessor 10 has an output (INT REQ OUT) 24 and the output 24 of the interrupt generator 16 is coupled to both the first and second interrupt service routines 18 and 22.

Figure 2:
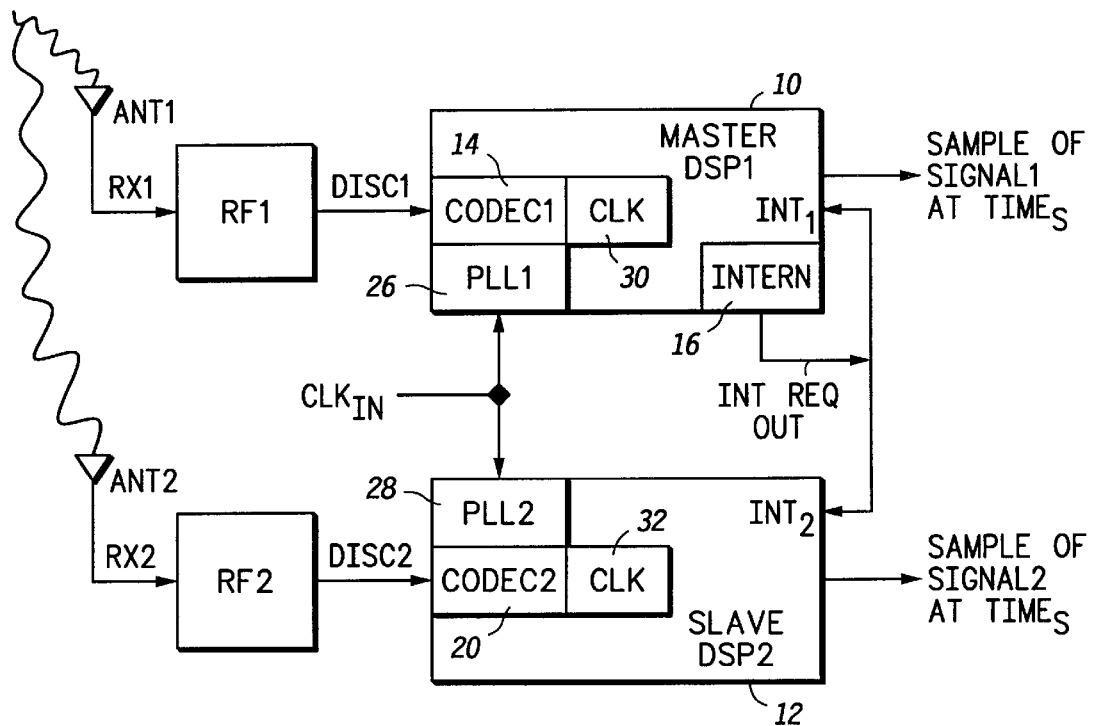
FIG. 2 is a block diagram of a diversity receiver implementing the first and second microprocessors according to the preferred embodiment of the present invention.

FIG. 2 illustrates a particular embodiment of this dual microprocessor structure in a diversity receiver for a communications base station. In this instance each DSP 10 and 12 is an independent microprocessor with its own internal CODEC 14 and 20, respectively. With diversity reception of communication signals, the received input signals (RX1 and RX2) are received at the antennas (ANT1 and ANT2, respectively) then passed through various radio frequency components (RF1 and RF2, respectively) in order to become output signals (DISC1 and DISC2, respectively) for input into their respective DSPs 10 and 12.

The purpose of diversity reception is to obtain the best quality communication signal by coherently combining the two received input signals (RX1 and RX2). Coherent combination requires precisely synchronous sampling or substantial processing delays must be introduced. Thus, the present invention described herein is necessitated to coherently combine the two received input signals (RX1 and RX2).

The first and second microprocessors 10 and 12 further comprise a first internal phase-locked loop (PLL) 26 and a second internal PLL 28, respectively. The first and second internal CODECs 14 and 20 comprise a first CODEC clock 30 and a second CODEC clock 32, respectively. The first and second CODEC clocks 30 and 32 are derived by the first and second internal PLLs 26 and 28, respectively, incorporating analog components thus having an unknown acquisition time, due to the tolerances of the external analog components.

Figure 3:
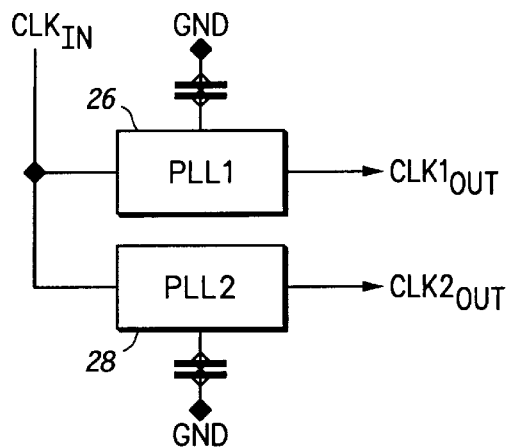
FIG. 3 is a block diagram of a phase-locked loop as implemented in the first and second microprocessors.

As is well known in the art, a PLL comprises a phase detector, a loop filter and a voltage-controlled oscillator (VCO). Phase lock is achieved by feeding a filtered version of a phase difference between an incoming signal and an output of the VCO into an input of the VCO. FIG. 3 illustrates the structure of the two PLLs 26 and 28 as implemented in the DSP of the diversity receiver. In this instance the purpose of the PLL is to convert a lower frequency input clock rate ($CLK_{in}$) into a higher frequency output clock rate ($CLK1_{out}$ and $CLK2_{out}$ receptively). Note the connections to the analog components (capacitor and ground).

Figure 4:
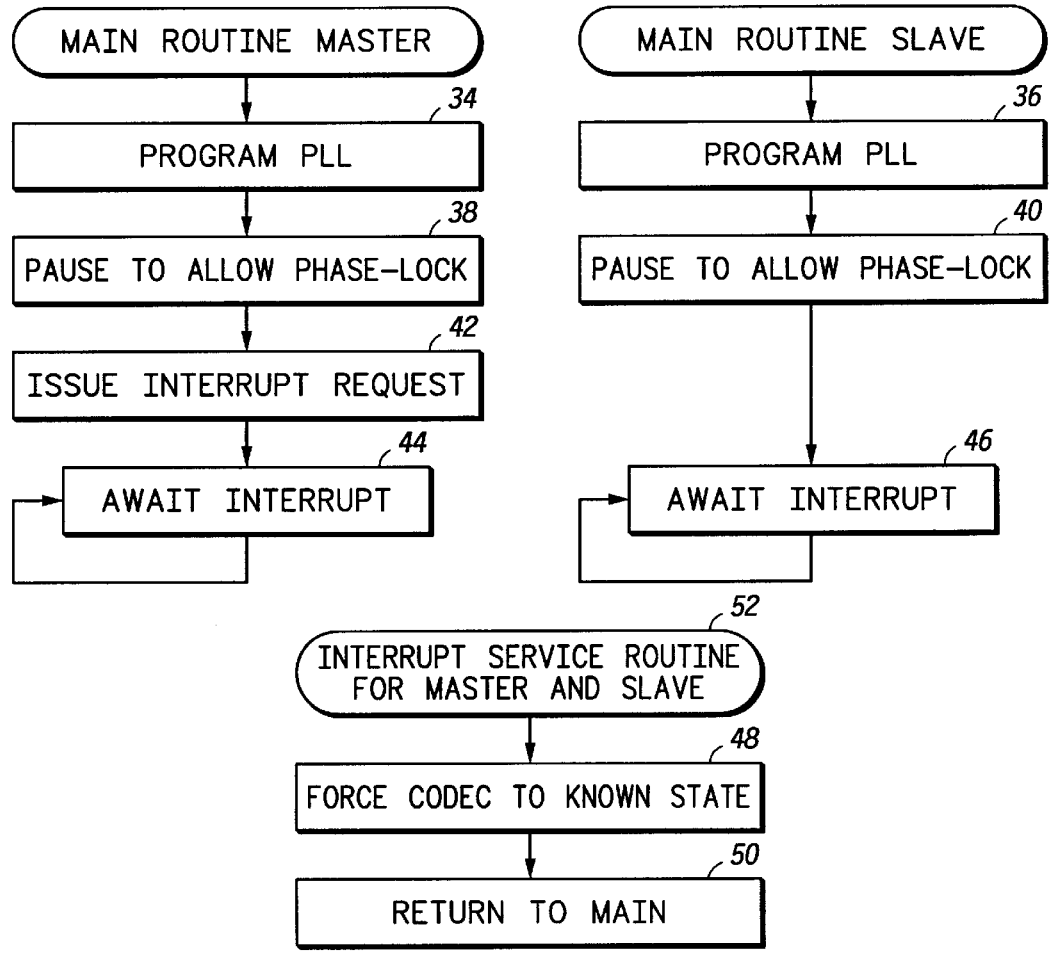
FIG. 4 is a software flow chart being implemented at the first and second microprocessors according to the preferred embodiment of the present invention.

FIG. 4 details a method of bringing sampling instants of time of the first internal CODEC of the first microprocessor into synchronization with sampling instants of the second internal CODEC of the second microprocessor. At steps 34 and 36, although the exact time for a specific microprocessor to achieve a phase lock is not known, there is a maximum time by which the microprocessor will obtain phase lock. Acquisition time is determined by the analog components of the PLL of known tolerance. By assuming the worst case components values, the maximum time to achieve phase lock is determined.

Having determined the maximum time to achieve phase lock, the first and second microprocessors 10 and 12 will wait a predetermined time to achieve phase lock at steps 38 and 40. Preferably, the predetermined time is a time that is grater than a maximum tolerance level of both the first and second microprocessors 10 and 12. Once a phase lock is achieved, the first and second microprocessors 10 and 12 are synchronized with each other. However, at this point in time, there remains a sampling time offset between the first and second internal CODECs 14 and 20.

At step 42, the first microprocessor generates a common interrupt to be sent to the first and second microprocessors 10 and 12. For purposes of explanation, the first microprocessor 10 operates as a master microprocessor and the second microprocessor 12, in turn, operates as a slave microprocessor. Once the interrupt triggers the interrupt service routines at steps 44 and 46 of both the first and second microprocessors 10 and 12 for the respective internal CODECs 14 and 20, the first and second microprocessors 10 and 12 are forced into a known state at a common time, at step 48, in response to receiving the common interrupt. Forcing the first and second microprocessors 10 and 12 into a known state at a common time results in eliminating the sampling time offset between the first and second internal CODECs 14 and 20. Thus, upon return from the interrupt service routine at step 50, both the first and second microprocessors 10 and 12 and their respective internal CODECs 14 and 20 are synchronized with sampling time offset. Note that processing steps for the interrupt service routine 52 are the same for both the first and second microprocessors 10 and 12. For the purposes of diversity reception and after eliminating the sampling time offset between the first and second internal CODECs 14 and 18, a first sample of a first data signal (SIGNAL1) is obtained from the first microprocessor 10 and a second sample of a second data signal (SIGNAL2) is obtained from the second microprocessor 12 at precisely TIMES.

While the invention has been described in conjunction with a specific embodiment thereof, additional advantages and modifications will readily occur to those skilled in the art. The invention, in its broader aspects, is therefore not limited to the specific details, representative apparatus and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. A method of bringing sampling instants of a first internal coder-decoder of a first microprocessor into synchronization with sampling instants of a second internal coder-decoder of a second microprocessor, the method comprising:

waiting, at the first microprocessor and the second microprocessor, a predetermined time to achieve phase lock between;

generating a common interrupt at the first microprocessor;

sending the common interrupt simultaneously to the first microprocessor and the second microprocessor;

receiving the common interrupt simultaneously by the first microprocessor and the second microprocessor; and forcing the first internal coder-decoder and the second internal coder-decoder into a known state simultaneously as a response to receiving the common interrupt.

2. The method according to claim 1 wherein the predetermined time is a time that is greater than a maximum tolerance level of both the first microprocessor and the second microprocessor.

3. The method according to claim 1 wherein after phase lock is achieved in the step of waiting, the first internal coder-decoder and the second internal coder-decoder are synchronized with each other.

4. The method according to claim 1 wherein after the step of forcing, eliminating a sampling time offset between the first internal coder-decoder and the second internal coder-decoder.

5. The method according to claim 4 wherein after eliminating the sampling time offset between the first internal coder-decoder and the second internal coder-decoder, further comprises:

obtaining a first sample of a first data signal from the first microprocessor; and obtaining a second sample of a second data signal from the second microprocessor, wherein the first sample and the second sample are taken at a same instant of time.

6. The method according to claim 1 further comprising:

operating the first microprocessor as a master microprocessor; and operating the second microprocessor as a slave microprocessor.

7. An apparatus comprising:

a first microprocessor having a first internal coder-decoder, an interrupt generator and a first interrupt service routine;

a second microprocessor having a second internal coder-decoder and a second interrupt service routine; and a common low frequency clock coupled to the first microprocessor and the second microprocessor, wherein the interrupt generator has an output and the output of the interrupt generator is coupled to both the first interrupt service routine and the second interrupt service routine.

8. The apparatus according to claim 7 wherein the first microprocessor and the second microprocessor further comprise a first internal phase-locked loop and a second internal phase-locked loop, respectively, wherein the first internal coder-decoder and the second internal coder-decoder comprise a first coder-decoder clock and a second coder-decoder clock, respectively, and wherein the first coder-decoder clock and the second coder-decoder clock are derived by the first internal phase-locked loop and the second internal phase-locked loop, respectively.

* * * * *